United States Patent
Dasgupta et al.

(10) Patent No.: US 10,904,788 B2
(45) Date of Patent: Jan. 26, 2021

(54) CONTROLLING A CONGESTION WINDOW VALUE FOR A WIRELESS DEVICE IN A HETEROGENEOUS NETWORK

(71) Applicant: Cisco Technology, Inc., San Jose, CA (US)

(72) Inventors: Sandeep Dasgupta, Bangalore (IN); Somaraju Kaki, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 440 days.

(21) Appl. No.: 15/792,012

(22) Filed: Oct. 24, 2017

(65) Prior Publication Data

US 2019/0124547 A1   Apr. 25, 2019

(51) Int. Cl.
*H04W 28/02* (2009.01)
*H04L 12/807* (2013.01)
(Continued)

(52) U.S. Cl.
CPC ......... *H04W 28/0289* (2013.01); *H04L 47/14* (2013.01); *H04L 47/193* (2013.01);
(Continued)

(58) Field of Classification Search
None
See application file for complete search history.

(56) References Cited

U.S. PATENT DOCUMENTS

| 9,014,264 | B1 | 4/2015 | Cheng et al. |
| 2013/0005240 | A1* | 1/2013 | Novak .................. H04W 36/06 455/11.1 |

(Continued)

FOREIGN PATENT DOCUMENTS

| EP | 2934041 A1 | 10/2015 |
| JP | 2010213013 A | 9/2010 |

OTHER PUBLICATIONS

L. Deng et al., "Use-cases and Requirements for MPTCP Proxy in ISP Networks draft-deng-mptcp-proxy-01", MPTCP Working Group, Internet-Draft, Intended Status: Informational, Oct. 24, 2014, 13 pages.

(Continued)

*Primary Examiner* — Gregory B Sefcheck
*Assistant Examiner* — Srinivasa R Reddivalam

(57) ABSTRACT

A method, performed by a wireless resource controller, includes receiving an indication that a first wireless device is experiencing data loss over a communication channel provided by a wireless access point utilizing a first radio access technology (RAT). The method includes determining a plurality of congestion window values associated with other wireless devices that share a shared wireless resource with the first wireless device. The shared wireless resource is provided by a base station of a cellular network utilizing a second RAT. The method includes determining an initial congestion window value for the first wireless device based on the plurality of congestion window values associated with the other wireless devices. The method includes transmitting data to the first wireless device from the base station in accordance with the initial congestion window value for the first device in order to satisfy a performance criterion for the first wireless device.

20 Claims, 7 Drawing Sheets

(51) Int. Cl.
*H04L 12/801* (2013.01)
*H04W 36/30* (2009.01)
*H04W 84/12* (2009.01)
*H04W 36/14* (2009.01)
*H04W 36/00* (2009.01)

(52) U.S. Cl.
CPC ......... *H04L 47/27* (2013.01); *H04W 28/0231* (2013.01); *H04W 28/0236* (2013.01); *H04W 28/0268* (2013.01); *H04W 28/0284* (2013.01); *H04W 36/305* (2018.08); *H04W 36/0011* (2013.01); *H04W 36/14* (2013.01); *H04W 84/12* (2013.01)

(56) References Cited

U.S. PATENT DOCUMENTS

| | | | | |
|---|---|---|---|---|
| 2013/0114408 A1* | 5/2013 | Sastry | ..................... | H04L 47/27 370/231 |
| 2014/0341109 A1* | 11/2014 | Cartmell | ................ | H04L 43/50 370/328 |
| 2016/0164785 A1* | 6/2016 | Flores | ..................... | H04L 47/27 370/237 |
| 2016/0373361 A1* | 12/2016 | Dhanabalan | ............ | H04L 47/24 |
| 2017/0019803 A1 | 1/2017 | Nguyen et al. | | |
| 2017/0156078 A1 | 6/2017 | Lee et al. | | |
| 2018/0077599 A1* | 3/2018 | Tan Bergstrom | ........................... | H04W 28/0215 |
| 2019/0037418 A1* | 1/2019 | Gunasekara | .......... | H04W 52/40 |

OTHER PUBLICATIONS

X. Wei et al., "MPTCP proxy mechanisms draft-wei-mptcp-proxy-mechanism-02", Internet-Draft, Intended Status: Standards Track, Jul. 1, 2015, 11 pages.

G. Hampel et al., "MPTCP Proxies and Anchors draft-hampel-mptcp-proxies-anchors-00", Multipath TCP, Internet-Draft, Intended status: Standards Track, Feb. 8, 2012, 30 pages.

Xinpeng Wei, "MPTCP proxy mechanisms (draft-wei-mptcp-proxy-mechanism-00", IETF 90 Toronto, Canada, downloaded Mar. 13, 2019, 8 pages.

The Broadband Forum, "TR-348 Hybrid Access Broadband Network Architecture", Issue: 1, Jul. 2016, 49 pages.

International Search Report and Written Opinion in counterpart International Application No. PCT/US2018/056809, dated Jan. 24, 2019, 14 pages.

W. Eddy, "Extending the Space Available for TCP Options", draft-eddy-tcp-loo-04, Network Working Group, Internet-Draft, Jul. 1, 2008, 18 pages.

O. Bonaventure et al., "Experimental Multipath TCP option", draft-bonaventure-mptcp-exp-option-00, MPTCP Working Group, Internet-Draft, Updates: 6824 (if approved), Intended status: Experimental, Jun. 16, 2015, 8 pages.

\* cited by examiner

CONTROLLING A CONGESTION WINDOW VALUE FOR A WIRELESS DEVICE IN A HETEROGENEOUS NETWORK

TECHNICAL FIELD

The present disclosure relates generally to heterogeneous networks, and in particular, to controlling a congestion window value for a wireless device in a heterogeneous network.

BACKGROUND

Mobile data usage has increased exponentially in recent years. Most mobile devices are capable of accessing different radio access technologies (RATs) in order to send/receive data and perform telecommunication operations. For example, most mobile devices are capable of accessing a base station of a cellular network and a wireless access point that utilizes a different RAT from the base station. While cellular networks provide high data rates, low latency and large geographical coverage, most cellular networks utilize a licensed spectrum. Due to the limited availability of licensed spectrums, many cellular network operators attempt to reduce the usage of their licensed spectrum. However, reducing the usage of the licensed spectrum sometimes negatively impacts the performance of mobile devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
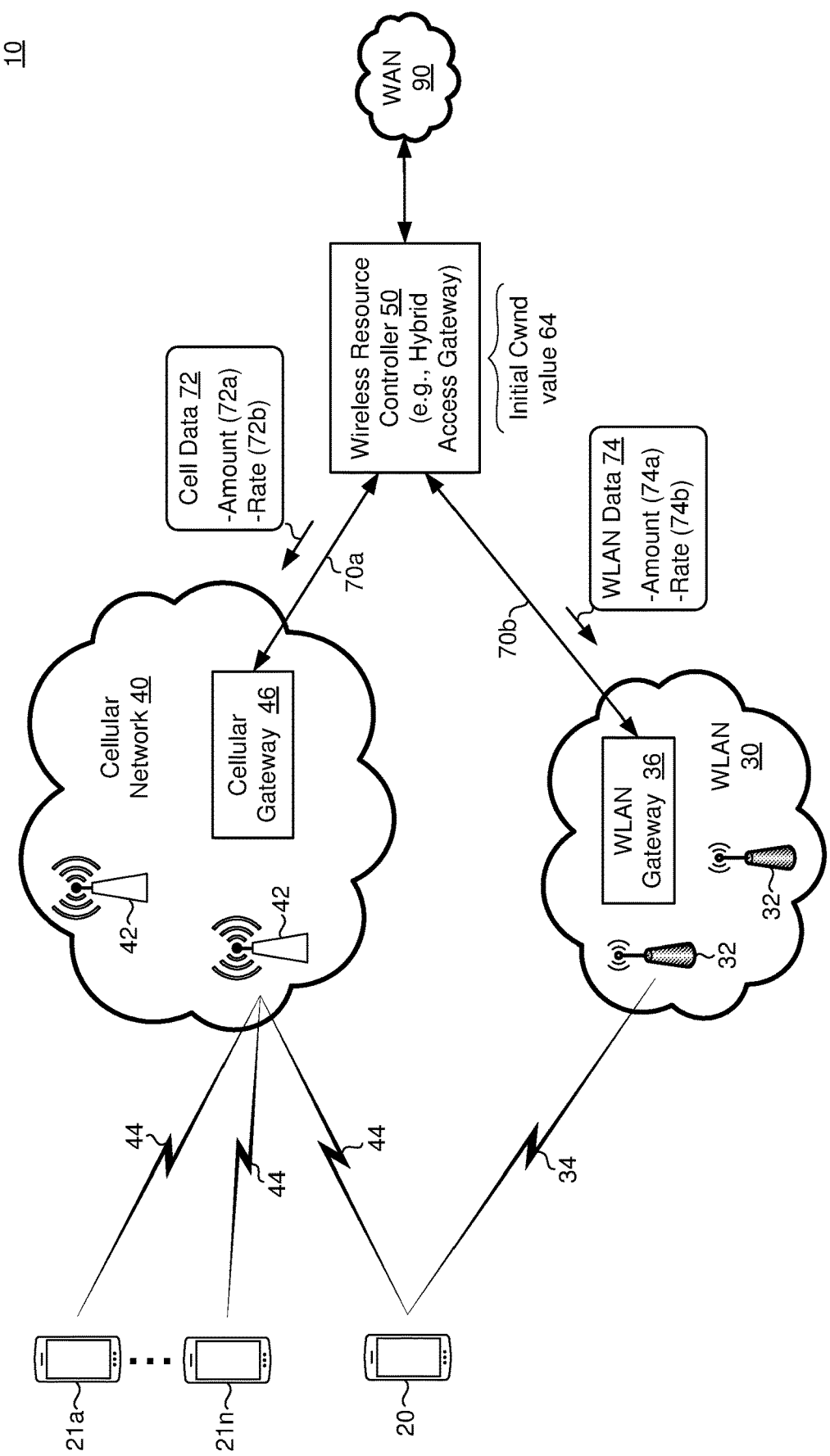
FIG. 1 is a schematic diagram of a heterogeneous network in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable controlling a congestion window value for a wireless device in a heterogeneous network. For example, in various implementations, a method of controlling a congestion window value for a wireless device is performed by a wireless resource controller. In various implementations, the wireless resource controller includes one or more processors, and a non-transitory memory. In various implementations, the method includes receiving an indication that a first wireless device is experiencing data loss over a communication channel provided by a wireless access point utilizing a first radio access technology (RAT). In various implementations, the method includes determining a plurality of congestion window values associated with other wireless devices that share a shared wireless resource with the first wireless device. In some implementations, the shared wireless resource is provided by a base station of a cellular network utilizing a second RAT. In various implementations, the method includes determining an initial congestion window value for the first wireless device based on the plurality of congestion window values associated with the other wireless devices. In various implementations, the method includes transmitting data to the first wireless device from the base station in accordance with the initial congestion window value for the first wireless device in order to satisfy a performance criterion for the first wireless device.

EXAMPLE EMBODIMENTS

FIG. 1 is a schematic diagram of a heterogeneous network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the heterogeneous network environment 10 includes a first wireless device 20 ("wireless device 20", hereinafter for the sake of brevity), other wireless devices 21a . . . 21n, a wireless local area network (WLAN) 30, a cellular network 40, a wireless resource controller (WRC) 50, and a Wide Area Network (WAN) 90 (e.g., a portion of the Internet, an Internet Service Provider (ISP), or the like). In some implementations, the WLAN 30 utilizes a first radio access technology (RAT), and the cellular network 40 utilizes a second RAT that is different from the first RAT. In some implementations, a RAT refers to an underlying physical connection method for a radio based communication network. In some implementations, the first RAT for the WLAN 30 utilizes a first frequency band (e.g., an unlicensed frequency band) and the second RAT for the cellular network 40 utilizes a second frequency band (e.g., a licensed frequency band) that is different from the first frequency band.

In various implementations, the WLAN 30 includes wireless access points (APs) 32 ("AP 32", hereinafter for the sake of brevity). In some implementations, the WLAN 30 provides a communication channel 34 between the wireless device 20 and at least one of the APs 32. The communication channel 34 allows the wireless device 20 to access the WLAN 30 and/or the WAN 90 via the AP 32. For example, in various implementations, the wireless device 20 utilizes the communication channel 34 to send/receive data to/from the WAN 90. In various implementations, the WLAN 30 operates in accordance with IEEE 802.11 standards. In various implementations, the WLAN 30 operates over an unlicensed spectrum. In other words, in some implementations, the WLAN 30 utilizes frequencies that are not licensed (e.g., the 2.4 GHz band and/or the 5 GHz band utilized by 802.11 compliant devices) in order to send/receive data to the wireless device 20. In some implementations, the WLAN 30 includes additional components such as a WLAN gateway 36. In some implementations, the WLAN gateway 36 routes packets from the WLAN 30 to another network (e.g., to the WAN 90). While FIG. 1 shows two APs 32, a person of ordinary skill in the art will understand that, in some implementations, the WLAN 30 includes fewer or more APs 32. Moreover, while FIG. 1 shows the APs 32 and the WLAN gateway 36 as being separate, a person of ordinary skill in the art will understand that, in some implementations, one of the APs 32 serves as the WLAN gateway 36.

In various implementations, the cellular network 40 includes base stations 42 and a cellular gateway 46. In various implementations, a base station 42 provides data and/or telephonic services to various cellular devices such as the wireless device 20 and the other wireless devices 21a . . . 21n. For example, in some implementations, the cellular network 40 provides a shared wireless resource 44 that the wireless device 20 and the other wireless devices 21a . . . 21n utilize to access the base station 42. In various implementations, the shared wireless resource 44 includes a communication channel that the wireless device 20 and the other wireless devices 21a . . . 21n utilize to transmit/receive data to/from the base station 42. In various implementations, the shared wireless resource 44 includes a frequency band that is part of a licensed spectrum. In various implementations, the shared wireless resource 44 is utilized by wireless devices that are in communication with the base station 42. In some implementations, at least some of the other wireless devices 21a . . . 21n are in electronic communication with another wireless network such as the WLAN 30.

In some implementations, the cellular network 40 operates in accordance with 3GPP standards. For example, in some implementations, the cellular network 40 includes a fifth-generation (5G) cellular network. In some implementations, the base station 42 includes an eNode B (eNB).

In various implementations, the cellular gateway 46 provides access to the cellular network 40. In various implementations, the cellular network 40 includes various cellular network nodes that perform respective cellular operations such as scheduling. A person of ordinary skill in the art will understand that, in some implementations, the cellular gateway 46 operates as a cellular network node. As such, in some implementations, the cellular gateway 46 performs various cellular-related operations such as scheduling. A person of ordinary art in the skill will understand that while the cellular gateway 46 is shown as being separate from the base stations 42, in some implementations, the cellular gateway 46 is integrated into one of the base stations 42. As such, in some implementations, one of the base stations 42 serves as the cellular gateway 46.

In various implementations, the wireless device 20 supports multiple RATs. In the example of FIG. 1, the wireless device 20 supports the first RAT utilized by the WLAN 30 and the second RAT utilized by the cellular network 40. As such, in the example of FIG. 1, the wireless device 20 is capable of receiving data from the AP 32 and/or the base station 42. In various implementations, the wireless device 20 is associated with a performance criterion. In some implementations, the performance criterion includes a data throughput value at which the wireless device 20 receives data. In some implementations, the performance criterion includes a data throughput value that is associated with a cellular service plan provided by the cellular network 70.

In various implementations, the wireless resource controller 50 provides data to the wireless device 20 via the WLAN 30 and/or the cellular network 40. As shown in FIG. 1, the wireless resource controller 50 is in electronic communication with the cellular network 40 via a first communication path 70a. In the example of FIG. 1, the wireless resource controller 50 is in electronic communication with the WLAN 30 via a second communication path 70b. In the example of FIG. 1, cellular data 72 refers to data that the wireless resource controller 50 sends to the wireless device 20 via the cellular network 40, and WLAN data 74 refers to data that the wireless resource controller 50 sends to the wireless device 20 via the WLAN 30. In some implementations, the wireless resource controller 50 limits an amount 72a of cellular data 72 and/or a data rate 72b for the cellular data 72, for example, in order to limit usage of the shared wireless resource 44. In some implementations, the wireless resource controller 50 sets an amount 74a of WLAN data 74 to be higher than the amount 72a of cellular data 72, and/or a data rate 74b for the WLAN data 74 to be higher than the data rate 74a for the cellular data 72. Since the wireless resource controller 50 is capable of accessing the WLAN 30 and the cellular network 40, in some implementations, the wireless resource controller 50 is referred to as a hybrid access gateway (HAG).

In some implementations, due to the limited availability of the shared wireless resource 44 and/or due to the cost of the shared wireless resource 44, the wireless resource controller 50 primarily transmits data to the wireless device 20 via the AP 32 (e.g., instead of the base station 42). For example, in some implementations, the wireless resource controller 50 directs a majority of the traffic (e.g., most of the traffic, for example, all of the traffic) from the WAN 90 to the wireless device 20 via the second communication path 70b (e.g., instead of the first communication path 70a). In some implementations, the wireless resource controller 50 utilizes the AP 32 to transmit data to the wireless device 20 while transmitting data through the communication channel 34 satisfies the performance criterion for the wireless device 20. For example, the wireless resource controller 50 transmits data to the wireless device 20 via the AP 32 while the communication channel 34 provides a data throughput that satisfies (e.g., is higher than or equal to) a data throughput threshold defined by the performance criterion for the wireless device 20. In some implementations, the wireless resource controller 50 limits the amount 72a of cellular data 72 and/or the data rate 72b for the cellular data 72 while the data rate 74b for the WLAN data 74b satisfies (e.g., is greater than) a data rate defined by the performance criterion for the wireless device 20. In some implementations, the wireless resource controller 50 does not utilize the shared wireless resource 44 to transmit data to the wireless device 20 while the communication channel 34 satisfies the performance criterion for the wireless device 20. As such, in some implementations, the shared wireless resource 44 does not transport data between the wireless device 20 and the base station 42 while the communication channel 34 satisfies the performance criterion for the wireless device 20.

In some implementations, the wireless resource controller 50 transmits data to the wireless device 20 through the cellular network 40 (e.g., the base station 42, for example, the shared wireless resource 44) when data transmissions to the wireless device 20 through the WLAN 30 (e.g., through the AP 32, for example, through the communication channel 34) breach the performance criterion for the wireless device 20. For example, in some implementations, the wireless resource controller 50 instructs the base station 42 to initiate data transmissions to the wireless device 20 over the shared wireless resource 44 when the communication channel 34 provides a data throughput that is lower than a data throughput threshold defined by the performance criterion for the wireless device 20. In some implementations, the wireless resource controller 50 increases the amount 72a of cellular data 72 and/or the data rate 72b for the cellular data 72 in response to the amount 72b of WLAN data 74 and/or the data rate 74b for the WLAN data 74b breaching (e.g., falling below) a threshold defined by the performance criterion for the wireless device 20.

In the example of FIG. 1, the wireless resource controller 50 is shown as being separate from the cellular network 40 and the WLAN 30. However, in some implementations, the wireless resource controller 50 is part of the cellular network 40. For example, in some implementations, the wireless resource controller 50 is implemented by a component of the cellular network 40 (e.g., the cellular gateway 46, the base station 42 and/or a cellular network node). In some implementations, the wireless resource controller 50 is part of the WLAN 30. In such implementations, the wireless resource controller 50 is implemented by the WLAN 30 (e.g., the AP 32 and/or the WLAN gateway 36). In some implementations, the wireless resource controller 50 is operated by a third party (e.g., by an entity that is different from a first entity that operates the WLAN 30 and a second entity that operates the cellular network 40).

In various implementations, the wireless device 20 transmits a request for data to the AP 32 and/or the base station 42. The AP 32 and/or the base station 42 forward the request to the wireless resource controller 50. The wireless resource controller 50 retrieves the requested data from the WAN 90. In various implementations, the wireless resource controller 50 transmits the data to the wireless device 20 via the WLAN 30 while the communication channel 34 satisfies the performance criterion for the wireless device 20. When the wireless resource controller 50 detects that the communication channel 34 breaches the performance criterion for the wireless device 20, the wireless resource controller 50 forwards the requested data to the cellular network 40 (e.g., to the cellular gateway 46) and instructs the cellular network 40 (e.g., the base station 42) to start transmitting the requested data to the wireless device 20 via the shared wireless resource 44.

In various implementations, the wireless resource controller 50 instructs the cellular network 40 (e.g., the base station 42) to initiate data transmissions to the wireless device 20 in accordance with an initial congestion window value 64. In various implementations, the initial congestion window value 64 corresponds to a data transfer rate at which the shared wireless resource 44 initially transports data between the wireless device 20 and the cellular network 40. For example, in some implementations, the initial congestion window value 64 corresponds to (e.g., defines) a data transfer rate at which the base station 42 initially transmits data to the wireless device 20 over the shared wireless resource 44. In some implementations, the wireless resource controller 50 determines the initial congestion window value 64 for the wireless device 20 based on respective congestion window values of the other wireless devices 21a ... 21n. For example, in some implementations, the initial congestion window value 64 is an average of the respective congestion window values of the other wireless devices 21a ... 21n. In some implementations, the initial congestion window value 64 is within a threshold of the average of the respective congestion window values of the other wireless devices 21a ... 21n. For example, in some implementations, the initial congestion window value 64 is a threshold percentage of the average of the respective congestion window values of the other wireless devices 21a ... 21n.

In some implementations, the wireless resource controller 50 determines the amount 72a of cellular data 72 to send based on the initial congestion window value 64. In some implementations, the wireless resource controller 50 determines the data rate 72b for the cellular data 72 based on the initial congestion window value 64. In some implementations, the amount 72a of cellular data 72 and/or the data rate 72b for the cellular data 72 are related to (e.g., directly proportional to) the initial congestion window value 64. As such, a higher initial congestion window value 64 causes the wireless resource controller 50 to increase the amount 72a of cellular data 72 and/or increase the data rate 72b for the cellular data 72.

In various implementations, initiating data transmissions from the base station 42 to the wireless device 20 in accordance with the initial congestion window value 64 satisfies the performance criterion for the wireless device 20. For example, transmitting data from the base station 42 to the wireless device 20 in accordance with the initial congestion window value 64 results in a data throughput that satisfies a data throughput threshold defined by the performance criterion of the wireless device 20. For example, transmitting data from the base station 42 to the wireless device 20 in accordance with the initial congestion window value 64 results in a data throughput that is greater than, equal to or within an acceptable threshold of the data throughput defined by the performance criterion for the wireless device 20.

In some implementations, the initial congestion window value 64 is different from a default congestion window value that is associated with a slow-start process. In some implementations, the initial congestion window value 64 is greater than the default congestion window value that is associated with the slow-start process of a Transmission Control Protocol (TCP) connection. In various implementations, the default congestion window value associated with the slow-start process breaches the performance criterion for the wireless device 20, whereas the initial congestion window value 64 satisfies the performance criterion for the wireless device 20. For example, the default congestion window value associated with the slow-start process provides a data throughput that is less than the data throughput defined by the performance criterion for the wireless device 20, whereas the initial congestion window value 64 provides a data throughput that is greater than, equal to or within an acceptable threshold of the data throughput defined by the performance criterion for the wireless device 20. In some implementations, the default congestion window value is 1

MSS (maximum segment size), whereas the initial congestion window value 64 is greater than 1 MSS. In some implementations, the amount 72a of cellular data 72 corresponding to the initial congestion window value 64 is greater than an amount of cellular data 72 corresponding to the default congestion window value associated with the slow-start process of a TCP connection. In some implementations, the data rate 72b for the cellular data 72 corresponding to the initial congestion window value 64 is greater than a data rate for the cellular data 72 corresponding to the default congestion window value associated with the slow-start process of a TCP connection.

In various implementations, the wireless resource controller 50 utilizes Transmission Control Protocol to transmit/receive data to/from the wireless device 20 via the first and second communication paths 70a and 70b. In some implementations, the wireless resource controller 50 utilizes multipath TCP (MPTCP) to transmit/receive data to/from the wireless device 20 via the first and second communication paths 70a and 70b. In some implementations, the wireless resource controller 50 also operates in accordance with the architectural guidelines for MPTCP development (e.g., as specified in RFC 6182) in addition to the implementation features described herein. In some implementations, the wireless resource controller 50 also utilizes TCP extensions for multipath operations (e.g., as specified in RFC 6824) in addition to the implementation features described herein. In various implementations, utilizing MPTCP allows the wireless resource controller 50 to transmit/receive data to/from the wireless device 20 via multiple paths. Although FIG. 1 illustrates two paths (e.g., the first and second communication paths 70a and 70b), a person of ordinary skill in the art will appreciate that, in some implementations, the wireless resource controller 50 utilizes more than two communication paths to transmit/receive data to/from the wireless device 20. In some implementations, the wireless resource controller 50 serves as a MPTCP proxy. In some implementations, the wireless resource controller 50 terminates a TCP connection from the WAN 90, and forwards data received from the WAN 90 to the wireless device 20. In some implementations, the wireless resource controller 50 establishes an MPTCP connection with the wireless device 20. Establishing the MPTCP allows the wireless resource controller 50 to forward the data received from the WAN 90 to the wireless device 20 via the WLAN 30 and/or the cellular network 40.

Figure 2:
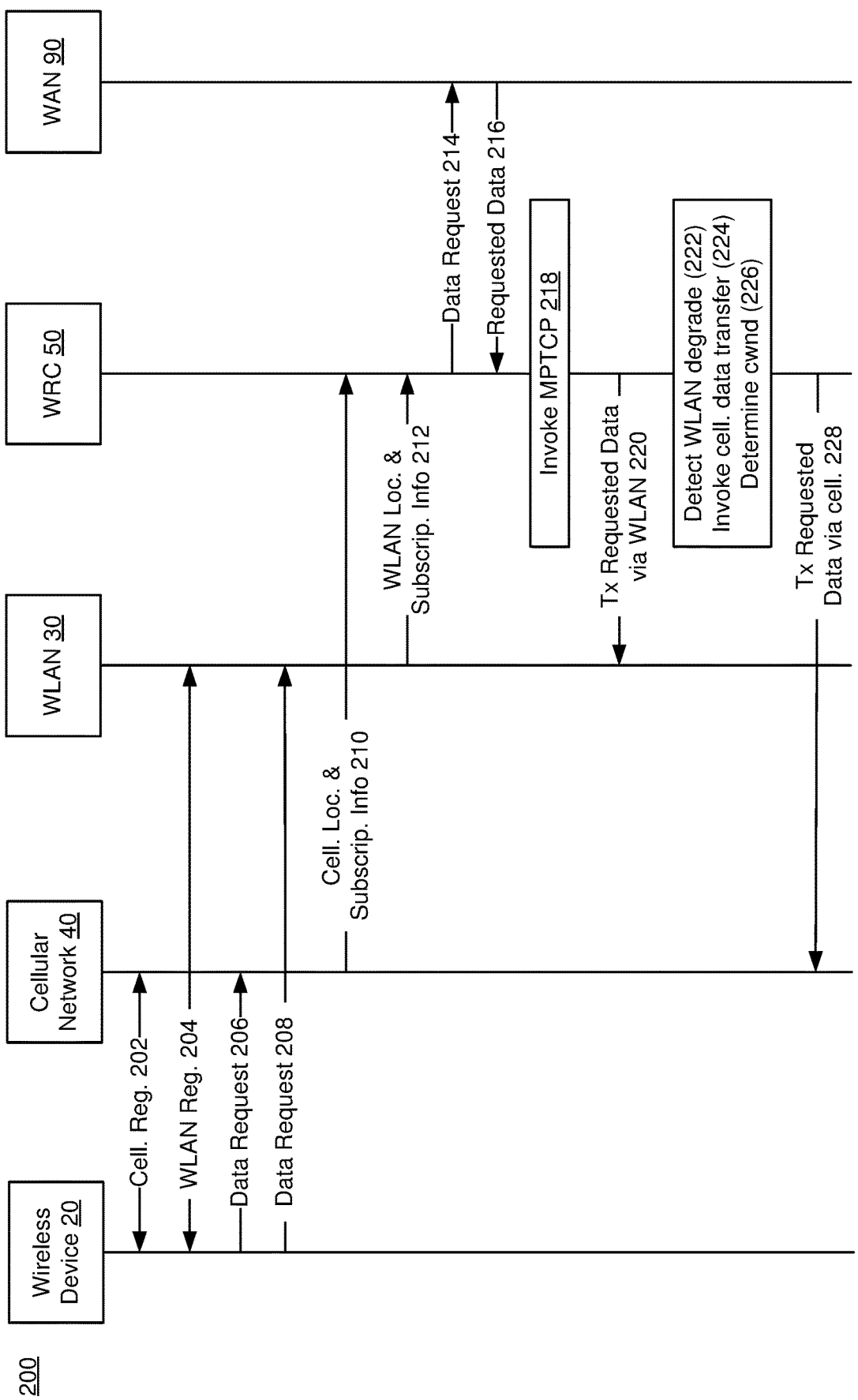
FIG. 2 is a sequence diagram of operations that occur between various components of the heterogeneous network in accordance with some implementations.

FIG. 2 is a sequence 200 that illustrates various operations between the wireless device 20, the WLAN 30 (e.g., the WLAN gateway 36), the cellular network 40 (e.g., the cellular gateway 46), the wireless resource controller 50, and a component of the WAN 90 (e.g., an Internet Service Provider (ISP)).

At 202, the wireless device 20 establishes a connection with the cellular network 40. For example, in some implementations, the wireless device 20 establishes a connection with the base station 42. In some implementations, the wireless device 20 registers with the cellular network 40. By registering with the cellular network 40, the wireless device 20 is able to access the shared wireless resource 44. As such, after registering with the cellular network 40, the wireless device 20 is able to receive/transmit data over the shared wireless resource 44. In some implementations, the wireless device 20 is assigned an Internet Protocol (IP) address by the cellular network 40.

At 204, the wireless device 20 establishes a connection with the WLAN 30. For example, in some implementations, the wireless device 20 establishes a connection with the AP 32. In some implementations, the wireless device 20 registers with the WLAN 30. By registering with the WLAN 30, the wireless device 20 is able to access the communication channel 34. As such, after registering with the WLAN 30, the wireless device 20 is able to receive/transmit data over the communication channel 34. In some implementations, the wireless device 20 is assigned an IP address by the WLAN 30.

At 206, the wireless device 20 transmits a request for data to the cellular network 40 (e.g., to the AP 42). In some implementations, the request indicates that the wireless device 20 is requesting data from the WAN 90. For example, in some implementations, the request indicates that the wireless device 20 is requesting a media item such as a video from a media streaming service. In various implementations, the cellular network 40 forwards the request to the wireless resource controller 50. As such, the wireless resource controller 50 receives the request for data from the cellular network 40.

At 208, the wireless device 20 transmits the request for data to the WLAN 30. In some implementations, the wireless device 20 transmits the request to the AP 32. While the transmission of the request to the cellular network 40 and the WLAN 30 is shown as separate operations, a person of ordinary skill in the art will appreciate that, in some implementations, the wireless device 20 transmits the request to the cellular network 40 and the WLAN 30 concurrently (e.g., simultaneously). In various implementations, the WLAN 30 forwards the request to the wireless resource controller 50. As such, the wireless resource controller 50 receives the request for data from the WLAN 30.

At 210, the cellular network 40 transmits location information and/or subscription information for one or more wireless devices to the wireless resource controller 50. For example, the cellular network 40 transmits location information and/or subscription information for the wireless device 20 and/or the other wireless devices 21a . . . 21n to the wireless resource controller 50. In some implementations, the location information includes respective geographical locations of the wireless device 20 and/or the other wireless devices 21a . . . 21n. For example, in some implementations, the location information includes respective Global Positioning System (GPS) coordinates. In some implementations, the location information indicates which cellular cell the wireless device 20 and/or the other wireless devices 21a . . . 21n are located in. In some implementations, the location information indicates which base station 42 the wireless device 20 and/or the other wireless devices 21a . . . 21n are connected with. In some implementations, the cellular network 40 sends the cellular location and/or the subscription information for the wireless device 20 to the wireless resource controller 50 when the cellular network 40 forwards the data request that the cellular network 40 received at 206.

In some implementations, the subscription information indicates respective cellular service plans of the wireless device 20 and the other wireless devices 21a . . . 21n. In some implementations, the subscription information indicates respective data throughputs, bandwidth allocations and/or type of service assigned to the wireless device 20 and the other wireless devices 21a . . . 21n. More generally, in various implementations, the subscription information indicates respective performance criteria for the wireless device 20 and the other wireless devices 21a . . . 21n.

In some implementations, the wireless resource controller 50 receives the location information and/or the subscription information for the wireless device 20 and the other wireless devices 21a ... 21n periodically. In some implementations, the wireless resource controller 50 receives the location information and/or the subscription information for the wireless device 20 and the other wireless devices 21a ... 21n in response to transmitting a request for the location information and/or the subscription information. In some implementations, the wireless resource controller 50 receives the location information and/or the subscription information for the wireless device 20 and the other wireless devices 21a ... 21n in response to a change in the location information and/or the subscription information. For example, in some implementations, the wireless resource controller 50 receives the location information and/or the subscription information in response to a change in the location and/or a change in the cellular service plan of the wireless device 20 and/or the other wireless devices 21a ... 21n. In some implementations, the wireless resource controller 50 stores the location information and/or the subscription information in a datastore. In some implementations, the wireless resource controller 50 updates the datastore in response to receiving updates to the location information and/or the subscription information. In some implementations, the wireless resource controller 50 receives packets (e.g., data packets and/or acknowledgement (ACK) packets)) that are tagged with the location information and/or the subscription information At 212, the wireless resource controller 50 receives location information and/or subscription information for the wireless device 20 and/or the other wireless devices 21a ... 21n from the WLAN 30. In some implementations, the location information indicates respective geographical locations of the wireless device 20 and/or the other wireless devices 21a ... 21n. For example, in some implementations, the location information indicates the AP 32 that the wireless device 20 and/or the other wireless devices 21a ... 21n are being served by (e.g., are in communication with). In some implementations, the subscription information received from the WLAN 30 indicates a performance of respective communication channels between the WLAN 30 and the wireless devices. For example, in some implementations, the subscription information indicates a data throughput of the communication channel 34 between the wireless device 20 and the WLAN 30. In some implementations, the wireless resource controller 50 utilizes the subscription information (e.g., the data throughput) to determine a performance of the WLAN 30. For example, in some implementations, the wireless resource controller 50 utilizes the data throughput of the communication channel 34 to determine whether to initiate data transmissions to the wireless device 20 through the cellular network 40. In some implementations, the WLAN 30 sends the location information and/or the subscription information for the wireless device 20 to the wireless resource controller 50 when the WLAN 30 forwards the data request that the WLAN 30 received at 208.

At 214, the wireless resource controller 50 forwards the request for data to a component of the WAN 90. For example, in some implementations, the wireless resource controller 50 forwards the request for data to an ISP. In some implementations, the wireless resource controller 50 determines a destination entity for the request (e.g., a server, for example, a web server), and forwards the request to the destination entity. A person of ordinary skill in the art will appreciate that the wireless resource controller 50 utilizes a variety of techniques to determine the destination entity for the request.

At 216, the wireless resource controller 50 receives the data corresponding to the request. For example, in some implementations, the request is for a video and the wireless resource controller 50 receives video frames in response to forwarding the request to the WAN 90.

At 218, the wireless resource controller 50 determines that there are multiple paths available to transmit the requested data to the wireless device 20. For example, referring to the non-limiting example of FIG. 1, the wireless resource controller 50 determines that the first and second communication paths 70a and 70b are available to transmit the requested data to the wireless device 20. In some implementations, the wireless resource controller 50 invokes MPTCP to transmit the data to the wireless device 20. As described herein, in various implementations, the wireless resource controller 50 utilizes one or more TCP extensions for multipath operations.

At 220, the wireless resource controller 50 transmits the requested data to the wireless device 20 via the WLAN 30. As described herein, the wireless resource controller 50 initially utilizes the WLAN 30 to transmit data to the wireless device 20 instead of utilizing the cellular network 40 due to the limited availability and/or the cost of the shared wireless resource 44. As such, in some implementations, the wireless resource controller 50 instructs the AP 32 to transmit the requested data to the wireless device 20.

At 222, the wireless resource controller 50 determines that transmitting data from the WLAN 30 to the wireless device 20 breaches a performance criterion for the wireless device 20. For example, the wireless resource controller 50 detects that a data throughput of the communication channel 34 is less than a data throughput threshold defined by the performance criterion for the wireless device 20. For example, referring to the non-limiting example of FIG. 1, the wireless resource controller 50 determines that transmitting data to the wireless device 20 through the second communication path 70b results in a data throughput that is less than the data throughput threshold defined by the performance criterion for the wireless device 20. More generally, in various implementations, the wireless resource controller 50 determines that transmitting data to the wireless device 20 via the WLAN 30 results in a performance that breaches the performance criterion for the wireless device 20. For example, in some implementations, the wireless resource controller 50 determines that transmitting data to the wireless device 20 via the WLAN 30 results in a data throughput, an error rate, a latency and/or a quality of service (QoS) that breaches a data throughput threshold, an error rate threshold, a latency threshold and/or a QoS threshold, respectively, defined by the performance criterion for the wireless device 20.

At 224, the wireless resource controller 50 determines to initiate data transmissions to the wireless device 20 via the cellular network 40. For example, referring to the non-limiting example of FIG. 1, the wireless resource controller 50 determines to initiate data transmissions to the wireless device 20 via the first communication path 70a. In some implementations, the wireless resource controller 50 determines to initiate data transmissions to the wireless device 20 over the shared wireless resource 44. In some implementations, prior to the determination of initiating data transmissions to the wireless device 20 over the shared wireless resource 44, the wireless device 20 does not receive data over the shared wireless resource 44.

At 226, the wireless resource controller 50 determines the initial congestion window value 64 for the wireless device 20. As described herein, in various implementations, the initial congestion window value 64 corresponds with an initial data transfer rate at which the wireless device 20 receives/transmits data through the shared wireless resource 44. As described herein, in some implementations, the wireless resource controller 50 determines the initial congestion window value 64 for the wireless device 20 based on a function of respective congestion window values of the other wireless devices 21a . . . 21n. For example, in some implementations, the wireless resource controller 50 sets the initial congestion window value 64 to an average of the congestion window values of the other wireless devices 21a . . . 21n. In some implementations, the wireless resource controller 50 sets the initial congestion window value 64 to a value that is within a threshold of the average of the congestion window values of the other wireless devices 21a . . . 21n. For example, the wireless resource controller 50 sets the initial congestion window value 64 to a predefined percentage (e.g., 95%, 90%, 85%, etc.) of the average of the congestion window values of the other wireless devices 21a . . . 21n.

In some implementations, the wireless resource controller 50 determines the congestion window values for the other wireless devices 21a . . . 21n. For example, in some implementations, the wireless resource controller 50 estimates the congestion window values for the other wireless devices 21a . . . 21n based on congestion conditions of the shared wireless resource 44. In some implementations, the wireless resource controller 50 obtains the congestion window values for the other wireless devices 21a . . . 21n. For example, in some implementations, the wireless resource controller 50 retrieves the congestion window values for the other wireless devices 21a . . . 21n from a datastore. For example, in some implementations, the wireless resource controller 50 receives the congestion window values for the other wireless devices 21a . . . 21n from the cellular network 40 (e.g., from the cellular gateway 46). In some implementations, the wireless resource controller 50 obtains the congestion window values for the other wireless devices 21a . . . 21n periodically. In some implementations, the wireless resource controller 50 obtains the congestion window values for the other wireless devices 21a . . . 21n in response to (e.g., after) determining to initiate data transmissions to the wireless device 20 over the shared wireless resource 44.

In some implementations, the wireless resource controller 50 utilizes the location information associated with the other wireless devices 21a . . . 21n to determine which of the other wireless devices 21a . . . 21n are located within a threshold distance of the wireless device 20. In such implementations, the wireless resource controller 50 determines the initial congestion window value 64 for the wireless device 20 based on the respective congestion window values of the other wireless devices 21a . . . 21n that are within the threshold distance of the wireless device 20. In some implementations, the wireless resource controller 50 utilizes the location information associated with the other wireless devices 21a . . . 21n to determine which of the other wireless devices 21a . . . 21n are located in the same cellular cell as the wireless device 20. In such implementations, the wireless resource controller 50 determines the initial congestion window value 64 for the wireless device 20 based on the respective congestion window values of the other wireless devices 21a . . . 21n that are in the same cellular cell as the wireless device 20. In some implementations, the wireless resource controller 50 utilizes the location information that the wireless resource controller 50 receives from the cellular network 40 (e.g., as shown at 210). In some implementations, the wireless resource controller 50 utilizes the location information that the wireless resource controller 50 receives from the WLAN 30 (e.g., as shown at 212).

In some implementations, the wireless resource controller 50 utilizes the subscription information associated with the other wireless devices 21a . . . 21n to determine which of the other wireless devices 21a . . . 21n have cellular service plans that are similar to or the same as the cellular service plan of the wireless device 20. In such implementations, the wireless resource controller 50 determines the initial congestion window value 64 for the wireless device 20 based on the respective congestion window values of the other wireless devices 21a . . . 21n that have cellular service plans that are similar to or the same as the cellular service plan of the wireless device 20. In some implementations, the wireless resource controller 50 utilizes the subscription information associated with the other wireless devices 21a . . . 21n to determine which of the other wireless devices 21a . . . 21n have bandwidth allocations that are within a threshold of a bandwidth allocation of the wireless device 20. In such implementations, the wireless resource controller 50 determines the initial congestion window value 64 for the wireless device 20 based on the respective congestion window values of the other wireless devices 21a . . . 21n that have bandwidth allocations that are within the threshold of the bandwidth allocation for the wireless device 20. In some implementations, the wireless resource controller 50 utilizes the subscription information that the wireless resource controller 50 receives from the cellular network 40 (e.g., as shown at 210).

At 228, the wireless resource controller 50 transmits the requested data to the wireless device 20 via the cellular network 40 in accordance with the initial congestion window value 64. In some implementations, the wireless resource controller 50 instructs the base station 42 to initiate data transmissions to the wireless device 20 over the shared wireless resource 44 in accordance with the initial congestion window value 64. In some implementations, initiating data transmissions from the base station 42 to the wireless device 20 in accordance with the initial congestion window value 64 satisfies a performance criterion for the wireless device 20. For example, initiating data transmissions in accordance with the initial congestion window value 64 provides an initial data transfer rate (e.g., the data rate 72b shown in FIG. 1) that is within a threshold of a data transfer threshold defined by the performance criterion for the wireless device 20. In some implementations, the data transfer rate provided by the initial congestion window value 64 is greater than a data transfer rate provided by a default congestion window value associated with a slow-start process.

Figure 3:
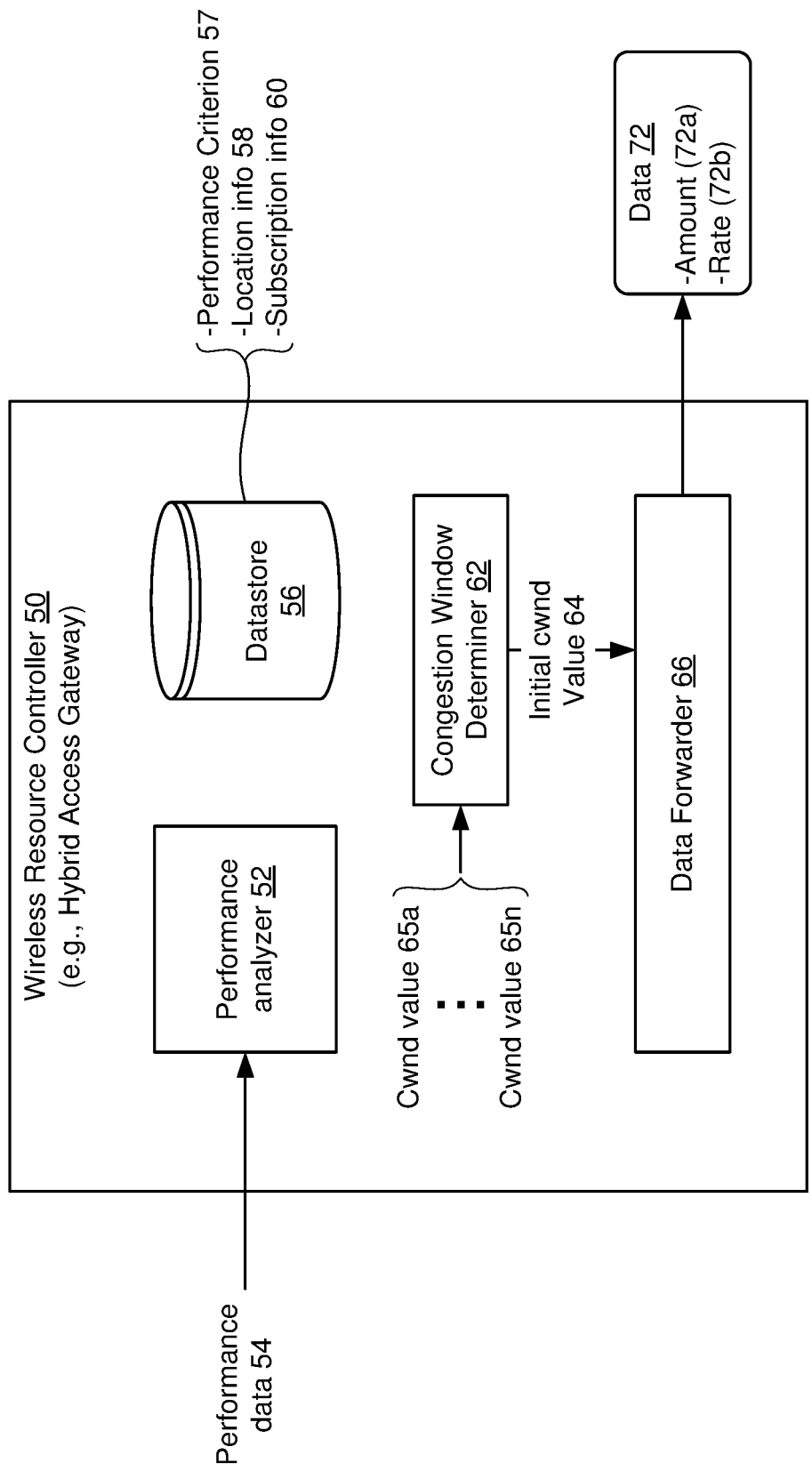
FIG. 3 is a block diagram of a wireless resource controller in accordance with some implementations.

FIG. 3 illustrates a block diagram of the wireless resource controller 50 in accordance with some implementations. In some implementations, the wireless resource controller 50 includes a performance analyzer 52, a datastore 56, a congestion window determiner 62, and a data forwarder 66. Briefly, in various implementations, the performance analyzer 52 analyzes a performance of the wireless device 20, the WLAN 30 and/or the communication channel 34, the datastore 56 stores a performance criterion 57 for the wireless device 20, the congestion window determiner 62 determines the initial congestion window value 64 for the wireless device 20, and the data forwarder 66 forwards data to the wireless device 20 in accordance with the initial congestion window value 64.

In various implementations, the datastore 56 stores the performance criterion 57 for the wireless device 20. In some implementations, the data store 56 stores respective performance criterion for the other wireless devices 21a . . . 21n. In some implementations, the performance criterion 57 defines an acceptable data transfer rate (e.g., an acceptable throughput) for the wireless device 20. In such implementations, the performance criterion 57 is satisfied when the wireless device 20 receives data at a rate that is equal to or greater than the data transfer rate defined by the performance criterion 57. In some implementations, the performance criterion 57 is breached when the wireless device 20 receives data at a rate that is less than the data transfer rate defined by the performance criterion 57.

In some implementations, the performance criterion 57 defines an acceptable error rate for data that the wireless device 20 receives. In such implementations, the performance criterion 57 is satisfied when the wireless device 20 receives data that has an error rate that is less than or equal to the error rate defined by the performance criterion 57. In some implementations, the performance criterion 57 is breached when the wireless device 20 receives data that has an error rate that is greater than the error rate defined by the performance criterion 57.

In some implementations, the performance criterion 57 defines an acceptable quality of service (QoS) for the wireless device 20. In such implementations, the performance criterion 57 is satisfied with a quality of service at the wireless device 20 is greater than or equal to the quality of service defined by the performance criterion 57. In some implementations, the performance criterion 57 is breached when the quality of service at the wireless device 20 is less than the quality of service defined by the performance criterion 57.

In some implementations, the performance criterion 57 is based on the cellular service plan of the wireless device 20. For example, different cellular service plans correspond with different values for the data transfer rate, the error rate and/or the quality of service defined by the performance criterion 57. In some implementations, the performance criterion 57 is specified by a user of the wireless device 20. For example, in some implementations, the user of the wireless device 20 specifies a quality of service that defines the performance criterion 57.

In some implementations, the performance criterion 57 is characterized by other performance metrics such as an acceptable latency level, an acceptable noise level, etc.

In some implementations, the datastore 56 stores location information 58 and/or subscription information 60 for the wireless device 20 and the other wireless devices 21a . . . 21n. In some implementations, the wireless resource controller 50 receives the location information 58 and/or the subscription information 58 from the cellular network 40 (e.g., as shown at 210 in FIG. 2) and/or the WLAN 30 (e.g., as shown at 212 in FIG. 2).

In various implementations, the performance analyzer 52 analyzes a performance of the wireless device 20, the WLAN 30 and/or the communication channel 34. In some implementations, the performance analyzer 52 analyzes the performance of the wireless device 20, the WLAN 30 and/or the communication channel 34 in order to determine whether the wireless device 20 is experiencing data loss over the communication channel 34. In some implementations, the performance analyzer 52 obtains performance data 54 that indicates a performance of the wireless device 20, the WLAN 30 and/or the communication channel 34. For example, in some implementations, the performance data 54 indicates a data transfer rate or a throughput of the communication channel 34. In some implementations, the performance data 54 indicates an error rate of data that the wireless device 20 receives from the WLAN 30 over the communication channel 34. In some implementations, the performance data 54 indicates a quality of service of the communication channel 34. More generally, in various implementations, the performance data 54 includes an indication that the wireless device 20 is experiencing data loss over the communication channel 34 provided by the WLAN 30.

In various implementations, the performance analyzer 52 determines whether the performance data 54 breaches the performance criterion 57. For example, in some implementations, the performance analyzer 52 determines whether a data transfer rate or a throughput indicated by the performance data 54 is less than a data transfer rate or a throughput defined by the performance criterion 57. In some implementations, if the data transfer rate or the throughput indicated by the performance data 54 is less than the data transfer rate or the throughput defined by the performance criterion 57, then the performance analyzer 52 determines that the performance data 54 breaches the performance criterion 57. In some implementations, if the data transfer rate or the throughput indicated by the performance data 54 is greater than or equal to the data transfer rate or the throughput defined by the performance criterion 57, then the performance analyzer 52 determines that the performance data 54 satisfies the performance criterion 57.

In some implementations, the performance analyzer 52 determines whether an error rate indicated by the performance data 54 is greater than an error rate defined by the performance criterion 57. In some implementations, if the error rate indicated by the performance data 54 is greater than the error rate defined by the performance criterion 57, then the performance analyzer 52 determines that the performance data 52 breaches the performance criterion 57. In some implementations, if the error rate indicated by the performance data 54 is less than or equal to the error rate defined by the performance criterion 57, then the performance analyzer 52 determines that the performance data 52 satisfies the performance criterion 57.

In some implementations, the performance analyzer 52 determines whether a quality of service value indicated by the performance data 54 is less than a quality of service value defined by the performance criterion 57. In some implementations, if the quality of service value indicated by the performance data is less than the quality of service value defined by the performance criterion 57, then the performance analyzer 52 determines that the performance data 54 breaches the performance criterion 57. In some implementations, if the quality of service value indicated by the performance data is greater than or equal to the quality of service value defined by the performance criterion 57, then the performance analyzer 52 determines that the performance data 54 satisfies the performance criterion 57.

In various implementations, the wireless resource controller 50 (e.g., the congestion window determiner 62) determines to initiate data transmissions to the wireless device 20 via the cellular network 40 in response to the performance data 54 breaching the performance criterion 57. For example, in some implementations, the wireless resource controller 50 determines to start transmitting data to the wireless device 20 over the shared wireless resource 44 in response to the wireless device 20 experiencing data loss over the communication channel 34 provided by the WLAN 30. For example, in some implementations, the wireless resource controller 50 determines to increase the amount 72a of cellular data 72 and/or the data rate 72b for the cellular data 72 in response to the wireless device 20 experiencing data loss over the communication channel 34 provided by the WLAN 30.

In various implementations, the congestion window determiner 62 determines an initial congestion window value 64 for the wireless device 20 based on a function of respective congestion window values 65a . . . 65n of the other wireless devices 21a . . . 21n. In some implementations, the congestion window values 65a . . . 65n of the other wireless devices 21a . . . 21n are stored in the datastore 56. In such implementations, the congestion window determiner 62 obtains the congestion window values 65a . . . 65n from the datastore 56. In some implementations, the congestion window determiner 62 obtains the congestion window values 65a . . . 65n from the cellular network 40 (e.g., from the cellular gateway 46). In some implementations, the congestion window determiner 62 estimates the congestion window values 65a . . . 65n based on congestion conditions of the shared wireless resource 44.

In some implementations, the congestion window determiner 62 sets the initial congestion window value 64 to an average of the congestion window values 65a . . . 65n. In some implementations, the congestion window determiner 62 sets the initial congestion window value 64 to a value that is within a threshold of the average of the congestion window values 65a . . . 65n. For example, in some implementations, the congestion window determiner 62 sets the initial congestion window value 64 to a threshold percentage (e.g., 90%) of the average of the congestion window values 65a . . . 65n.

In various implementations, the congestion window determiner 62 sets the initial congestion window value 64 to a value that satisfies the performance criterion 57. For example, in some implementations, the congestion window determiner 62 sets the initial congestion window value 64 to a value that allows the wireless device 20 to receive data through the shared wireless resource 44 at a data transfer rate that is greater than or equal to a data transfer rate defined by the performance criterion 57. In some implementations, the initial congestion window value 64 allows the shared wireless resource 44 to start transporting data to the wireless device 20 at a throughput that exceeds a throughput defined by the performance criterion 57. In some implementations, the initial congestion window value 64 allows the shared wireless resource 44 to start transmitting data to the wireless device 20 at an error rate that is less than an error rate defined by the performance criterion 57. In some implementations, the initial congestion window value 64 allows the shared wireless resource 44 to start transmitting data to the wireless device 20 at a quality of service that exceeds a quality of service defined by the performance criterion 57.

In various implementations, the initial congestion window value 64 allows the wireless device 20 to receive data at a data transfer rate that is within a threshold of a data transfer rate that the communication channel 34 provided prior to experiencing data loss. For example, in some implementations, the data transfer rate over the shared wireless resource 44 is the same as the data transfer rate over the communication channel 34 prior to the occurrence of data loss over the communication channel 34. In various implementations, the initial congestion window value 64 allows the wireless device 20 to have a performance that is within a threshold of a performance that the wireless device 20 had prior to the occurrence of data loss over the communication channel 34. In some implementations, the initial congestion window value 64 causes an increase in the amount 72a of cellular data 72 and/or the data rate 72b for the cellular data 72 in order to compensate for the data loss occurring over the communication channel 34.

In some implementations, the congestion window determiner 62 utilizes the location information 58 to determine which of the other wireless devices 21a . . . 21n are within a threshold distance of the wireless device 20. For example, the congestion window determiner 62 determines which of the other wireless devices 21a . . . 21n are in the same city/state/country and/or same cellular cell as the wireless device 20 based on the location information 58. In such implementations, the congestion window determiner 62 filters out the congestion window values of other wireless devices that are not within the threshold distance of the wireless device 20. As such, in some implementations, the congestion window determiner 62 determines the initial congestion window value 64 based on the congestion window values of other wireless devices that are within the threshold distance of the wireless device 20.

In some implementations, the congestion window determiner 62 utilizes the subscription information 60 to determine which of the other wireless devices 21a . . . 21n have performance criteria that is within a threshold of the performance criterion 57. For example, in some implementations, the congestion window determiner 62 determines which of the other wireless devices 21a . . . 21n have bandwidth allocations that are within a threshold of a bandwidth allocation for the wireless device 20. In such implementations, the congestion window determiner 62 filters out the congestion window values of other wireless devices that have performance criteria that are not within the threshold of the performance criterion 57 for the wireless device 20. As such, in some implementations, the congestion window determiner 62 determines the initial congestion window value 64 based on the congestion window values of other wireless devices that have performance criteria that are within the threshold of the performance criterion 57.

In various implementations, the data forwarder 66 forwards the cellular data 72 to the wireless device 20 via the cellular network 40 in accordance with the initial congestion window value 64. For example, in some implementations, the data forwarder 66 sets the amount 72a of cellular data 72 and/or the data rate 72b for the cellular data 72 based on the initial congestion window value 64. In some implementations, the amount 72a of cellular data 72 that the data forwarder 66 forwards to the cellular network 40 is related to (e.g., proportional to) the initial congestion window value 64. In some implementations, the data rate 72b at which the data forwarder 66 forwards the cellular data 72 to the cellular network 40 is related to (e.g., proportional to) the initial congestion window value 64.

In various implementations, the datastore 56 is stored in a non-transitory memory (e.g., a storage device). In various implementations, the performance analyzer 52 and the congestion window determiner 62 are, at least partially, implemented by hardware components (e.g., electric circuits, application specific integrated circuits, a processing device, etc.). In some implementations, the performance analyzer 52 and the congestion window determiner 62 are, at least partially, implemented as computer-readable instructions that are executed by a processing device.

Figure 4:
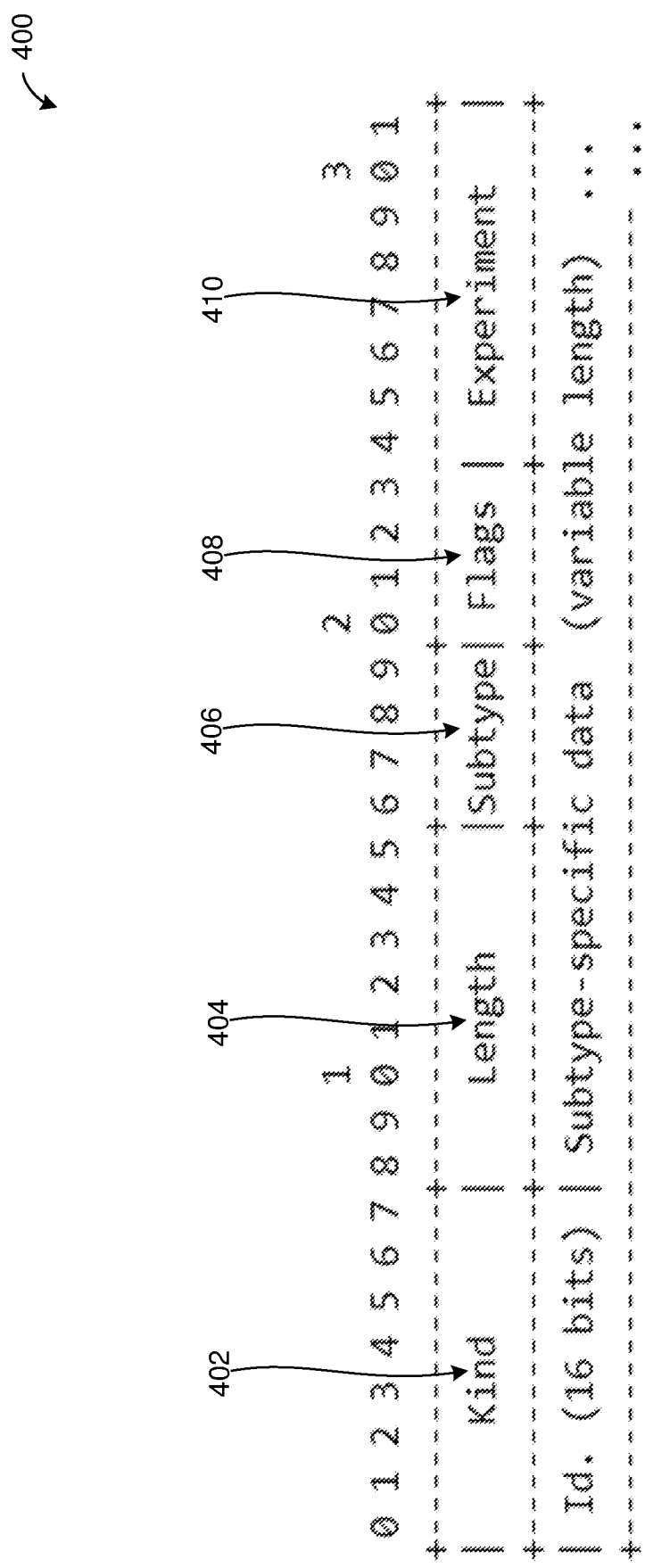
FIG. 4 is a diagram of an encoding structure in accordance with some implementations.

FIG. 4 illustrates an example encoding structure 400 for multipath communication. In some implementations, the encoding structure 400 represents an encoding for multipath TCP (MPTCP) options. In some implementations, the MPTCP options allow a connection to utilize multiple communication paths. For example, in some implementations, the encoding structure 400 allows the wireless resource controller 50 to utilize the first and second communication paths 70a and 70b to transmit data to the wireless device 20. In some implementations, the wireless resource controller 50 receives the location information 58 and/or subscription information 60 for the wireless device 20 and the other wireless devices 21a . . . 21n via the encoding structure 400.

As shown in FIG. 4, the encoding structure 400 includes various data fields. In the example of FIG. 4, the encoding structure 400 includes a kind field 402, a length field 404, a subtype field 406, a flags field 408 and an experimental field 410. In some implementations, MPTCP is available when the kind field 402 has a value of thirty (30). In some implementations, MPTCP is available when the subtype field 406 has a value of 0xF that corresponds with an experimental MPTCP sub-option. In some implementations, the wireless resource controller 50 receives the location information 58 and/or the subscription information 60 when the subtype field 406 has a value of 0xF. In some implementations, the wireless resource controller 50 receives the location information 58 and/or the subscription information 60 via an experiment ID field and a subtype-specific data field.

In some implementations, a TCP header limits the number of bytes that are utilized to send MPTCP options. For example, in some implementations, a TCP header has a limit of 40 bytes to send MPTCP options. As such, in some implementations, the wireless resource controller 50 does not receive the location information 58 and/or the subscription information 60 in a single packet.

In some implementations, the TCP header is extended (e.g., to a size beyond 60 bytes). In such implementations, extending the TCP header also increases the number of bytes available for the TCP options. For example, in some implementations, the TCP options space is extended via long options (LO) and/or syn long options (SLO). In some implementations, the WLAN gateway 36 and/or the cellular gateway 46 snoop the TCP packets and append two sets of MPTCP sub options. In some implementations, one set of MPTCP sub options utilize an experiment ID of 0x01 for the location information 58 while another set of MPTCP sub options utilize an experiment ID of 0x02 for the subscription information 60. In some implementations, the location information 58 and/or the subscription information 60 is carried in the subtype-specific data fields. Since the subtype-specific data field has a variable length and the TCP header/option size is extendable, in some implementations, the wireless resource controller 50 receives the location information 58 and/or the subscription information 60 in a TCP-SYN message. In some implementations, extending the TCP header allows the wireless resource controller 50 to receive the location information 58 and/or the subscription information 60 in a single packet. In some implementations, utilizing the LO/SLO options allows the wireless resource controller 50 to receive the location information 58 and/or the subscription information 60 in a single packet. In some implementations, an entity (e.g., a middle box) that processes packets with LO/SLO options allows the wireless resource controller 50 to receive the location information 58 and/or the subscription information 60 in a single packet.

In some implementations, the wireless resource controller 50 receives the location information 58 and/or the subscription information 60 over multiple packets. In some implementations, an experiment ID of 0x01 represents complete location information 58, whereas an experiment ID of 0x02 represents partial location information 58. In some implementations, an experiment ID of 0x03 represents complete subscription information 60, whereas an experiment ID of 0x04 represents partial subscription information 60. In some implementations, when the wireless resource controller 50 receives a TCP packet with an experiment ID of 0x02, the wireless resource controller 50 determines that a number of subsequent TCP packets include location information 58. In some implementations, when the wireless resource controller 50 receives a TCP packet with an experiment ID of 0x04, the wireless resource controller 50 determines that a number of subsequent TCP packets include subscription information 60. In some implementations, the wireless resource controller 50 retrieves the location information 58 and/or the subscription information 60 from the subtype-specific data fields of TCP packets. In some implementations, the subtype-specific data fields have a variable length. In some implementations, the length of the subtype-specific data fields is adjusted based on an allowed TCP option length. In some implementations, if the location of a wireless device is "loc_LTE", the wireless resource controller 50 receives a first TCP packet that includes a part of the location (e.g., "loc") and a second TCP packet includes the remainder of the location (e.g., "_LTE"). In such implementations, the first TCP packet includes an experiment ID of 0x02 indicating that the wireless resource controller 50 has received a part of the location information 58, and the second TCP packet includes an experiment ID of 0x01 indicating that the wireless resource controller 50 has received the entire location information 58. In some implementations, the wireless resource controller 50 concatenates the fragmented location information 58 and stores the concatenated location information 58 in the datastore 56.

Figure 5A:
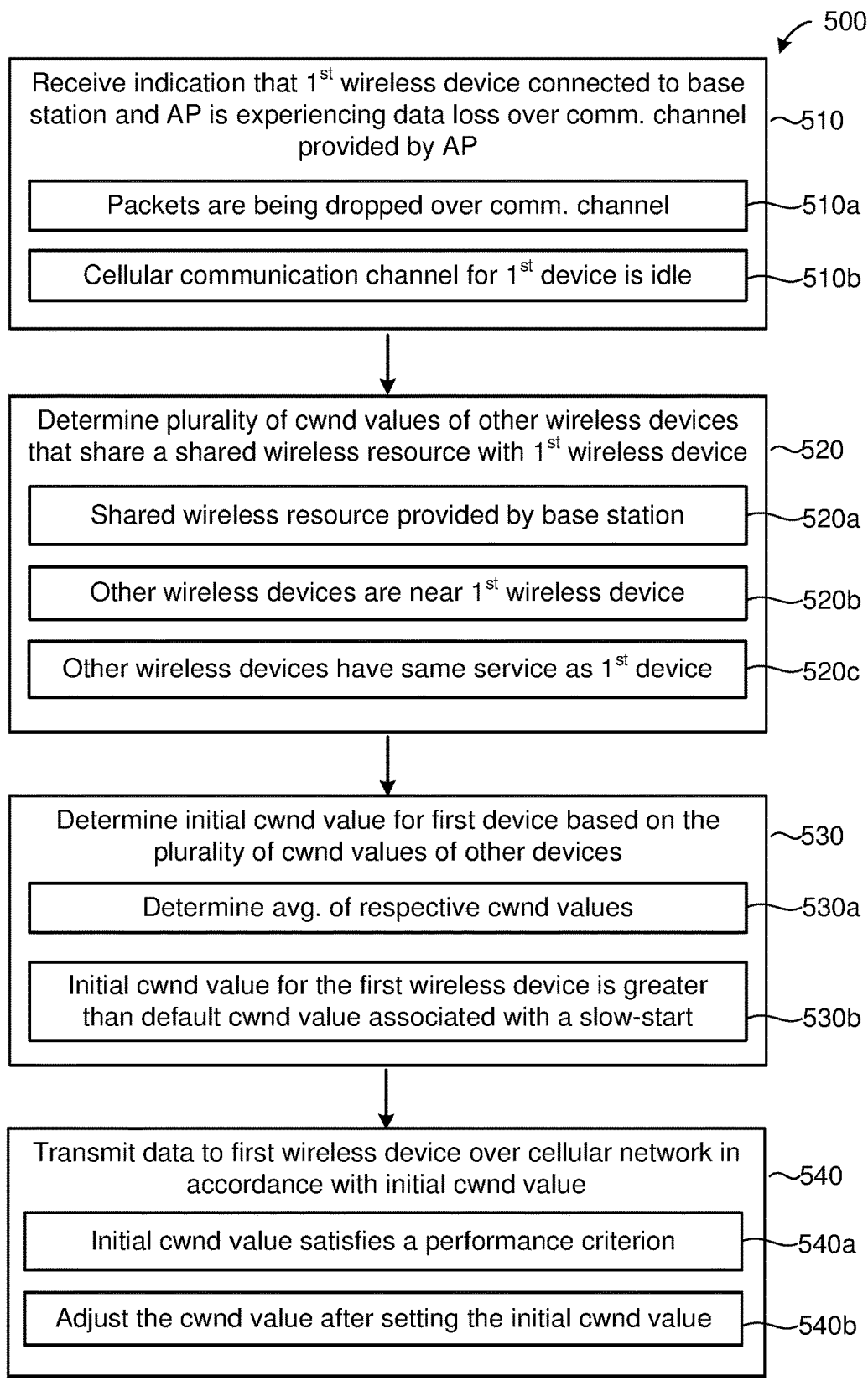
FIG. 5A is a flowchart representation of a method of controlling a congestion window value for a wireless device in a heterogeneous network in accordance with some implementations.

FIG. 5A is a flowchart representation of a method 500 of providing data to a wireless device (e.g., the wireless device 20 shown in FIGS. 1-2) over a heterogeneous network in accordance with some implementations. In various implementations, the method 500 is implemented as a set of computer readable instructions that are executed at a wireless resource controller (e.g., the wireless resource controller 50 shown in FIGS. 1-3). Briefly, the method 500 includes receiving an indication that a first wireless device is experiencing data loss over a communication channel provided by an access point that utilizes a first RAT, determining a plurality of congestion window values of other wireless devices that share a shared wireless resource with the first wireless device on a second available RAT, determining an initial congestion window value for the first wireless device based on the plurality of congestion window values, and transmitting data to the first wireless device over a cellular network in accordance with the initial congestion window value.

As represented by block 510, in various implementations, the method 500 includes receiving an indication that a first wireless device (e.g., the wireless device 20 shown in FIGS. 1-2) connected to an access point that utilizes a first RAT is experiencing data loss over a communication channel (e.g., the communication channel 34 shown in FIG. 1) provided by the access point. For example, as shown in FIG. 3, in some implementations, the method 500 includes receiving the performance data 54 and determining that the performance data 54 breaches the performance criterion 57 for the wireless device 20. As represented by block 510a, in some implementations, the method 500 includes determining that packets are being dropped by the communication channel between the wireless device and the access point. For example, as shown in FIG. 1, in some implementations, the method 500 includes determining that packets are being dropped over the communication channel 34. In some implementations, the method 500 includes receiving an indication that a data transfer rate at the first wireless device is less than a data transfer rate defined by a performance criterion for the wireless device. In some implementations, the method 500 includes receiving an indication that a data throughput of the communication channel provided by the access point is less than a data throughput defined by a performance criterion for the first wireless device. As represented by block 510b, in some implementations, a cellular communication channel between the first wireless device and the cellular network is idle. For example, the shared wireless resource 44 is not being used by the wireless device 20.

As represented by block 520, in various implementations, the method 500 includes determining a plurality of congestion window values (e.g., the congestion window values 65a . . . 65n shown in FIG. 3) of other wireless devices that share a shared wireless resource with the first wireless device. As described herein, in some implementations, the shared wireless resource is provided by a second RAT (e.g., by a cellular network that utilizes the second RAT). In some implementations, the method 500 includes obtaining (e.g., retrieving, computing, estimating or receiving) the plurality of congestion window values. In some implementations, the method 500 includes retrieving the plurality of congestion window values from memory (e.g., retrieving the congestion window values 65a . . . 65n from the datastore 56 shown in FIG. 3). For example, in some implementations, the method 500 includes receiving the plurality of congestion window values from the cellular network (e.g., from the cellular gateway 46). In some implementations, the method 500 includes estimating the plurality of congestion window values based on congestion conditions of the shared wireless resource and/or the other wireless devices. As represented by block 520a, in some implementations, the shared wireless resource is provided by the base station. As described herein, in some implementations, the shared wireless resource includes a licensed frequency band.

As represented by block 520b, in some implementations, the method 500 includes identifying other wireless devices (e.g., the other wireless devices 21a . . . 21n shown in FIG. 1) that are within a threshold distance of the first wireless device. In some implementations, the method 500 includes identifying other wireless devices that are within the same city/state/country as the first wireless device. In some implementations, the method 500 includes identifying other wireless devices that are in the same cellular cell as the first wireless device. In some implementations, the method 500 includes identifying other wireless devices that are being served by the same base station as the first wireless device. In some implementations, the method 500 includes utilizing location information (e.g., the location information 58 shown in FIG. 3) of various wireless devices to identify other wireless devices that are within the threshold distance of the first wireless device. In some implementations, the method 500 includes receiving the location information via MPTCP options of a TCP header.

As represented by block 520c, in some implementations, the method 500 includes identifying other wireless devices that have a similar level of subscribed service parameters or the same level of subscribed service parameters as the first wireless device. In some implementations, the method 500 includes identifying other wireless devices that have a bandwidth allocation that is within a threshold of a bandwidth allocation for the first wireless device. In some implementations, the method 500 includes identifying other wireless devices that are on the same cellular service plan as the first wireless device. In some implementations, the method 500 includes identifying other wireless devices that have a similar/same service as the first wireless device based on the subscription information of various wireless devices (e.g., based on the subscription information 60 shown in FIG. 3).

As represented by block 530, in various implementations, the method 500 includes determining an initial congestion window value (e.g., the initial congestion window value 64 shown in FIGS. 1 and 3) for the first wireless device based on a function of the plurality of congestion window values for the other wireless devices (e.g., based on the congestion window values 65a . . . 65n shown in FIG. 3). As represented by block 530a, in some implementations, the method 500 includes determining an average of the congestion window values of the other wireless devices. In some implementations, the method 500 includes setting the initial congestion window value to the average of the congestion window values of the other wireless devices that are currently active on the second RAT (e.g., other wireless devices that are currently transmitting/receiving data over the second RAT). In some implementations, the method 500 includes setting the initial congestion window value to a value that is within a threshold of the average of the congestion window values of the other wireless devices. For example, in some implementations, the method 500 includes setting the initial congestion window value to a predefined percentage of the average of the congestion window values of the other wireless devices. As represented by block 530b, in some implementations, the method 500 includes setting the initial congestion widow value to a value that is greater than a default congestion window value that is associated with a slow-start process of TCP. As described herein, in some implementations, the default congestion window value breaches the performance criterion for the first wireless device, whereas the initial congestion window value satisfies the performance criterion for the first wireless device.

As represented by block 540, in various implementations, the method 500 includes transmitting data to the first wireless device over the cellular network in accordance with the initial congestion window value. For example, in some implementations, the method 500 includes forwarding an amount of data, determined based on the initial congestion window value (e.g., the amount 72a shown in FIGS. 1 and 3), to the wireless device via the cellular network. In some implementations, the method 500 includes forwarding data to the wireless device via the cellular network at a data rate (e.g., the data rate 72b shown in FIGS. 1 and 3) that is set based on the initial congestion window value. As represented by block 540a, in some implementations, the initial congestion window value satisfies a performance criterion for the wireless device. For example, as described herein, in some implementations, the initial congestion window value allows the shared wireless resource to provide the first wireless device a throughput that is greater than or equal to a throughput defined by the performance criterion for the first wireless device. As represented by block 540b, in some implementations, the method 500 includes adjusting the congestion window value for the first wireless device after setting the initial congestion window value. For example, in some implementations, the method 500 includes incrementing the congestion window value for the first wireless device (e.g., in order to increase the throughput between the first wireless device and the cellular network).

Figure 5B:
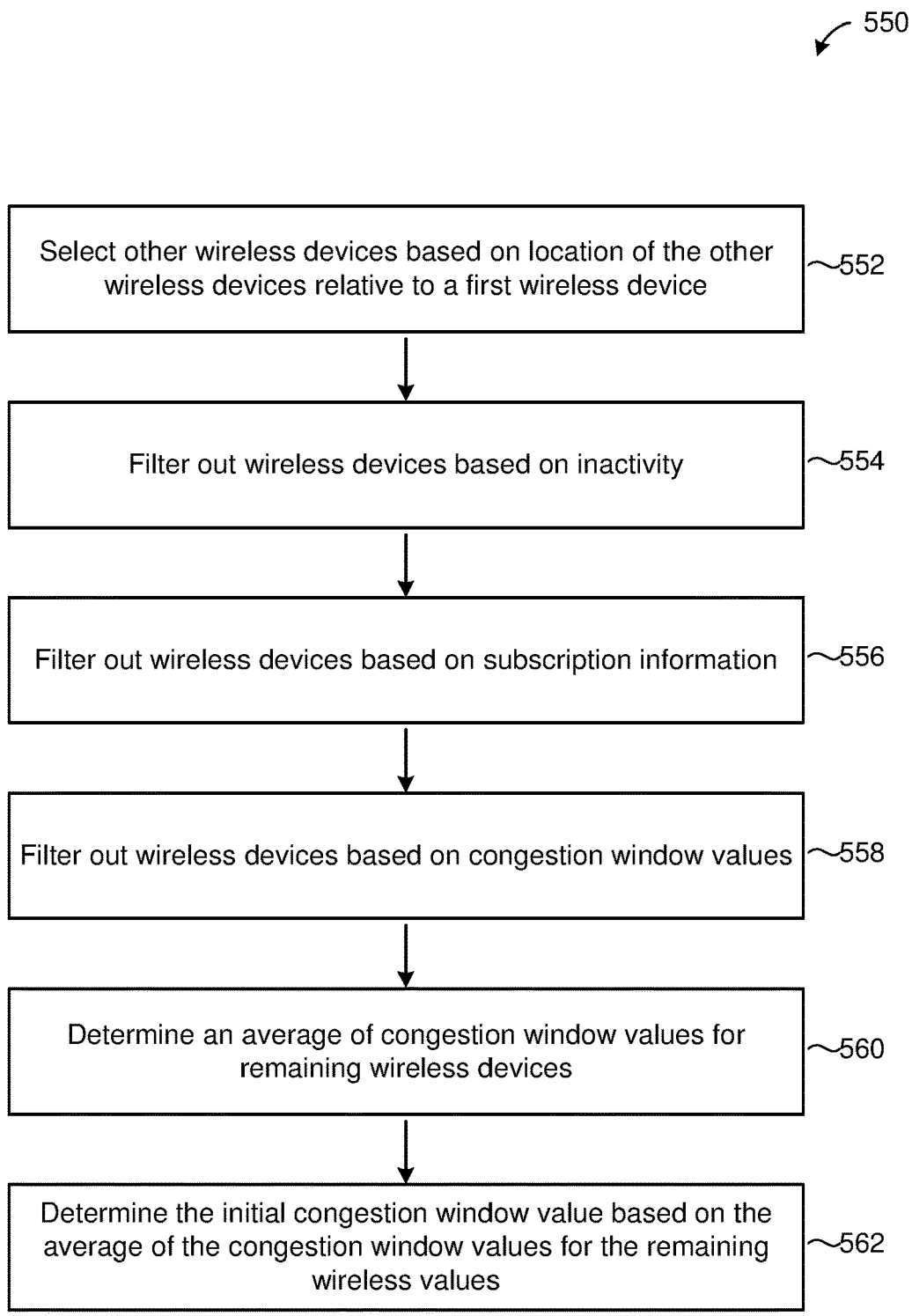
FIG. 5B is a flowchart representation of a method of determining an initial congestion window value for a wireless device in accordance with some implementations.

FIG. 5B is a flowchart representation of a method 550 of determining an initial congestion window value for a wireless device (e.g., the initial congestion window value 64 for the wireless device 20). In various implementations, the method 550 is implemented as a set of computer readable instructions that are executed at a wireless resource controller (e.g., the wireless resource controller 50 shown in FIGS. 1-3). In various implementations, a wireless device has access to a MPTCP connection that includes a cellular subflow and a WLAN subflow. For example, the wireless device 20 shown in FIG. 1 has access to a MPTCP connection that includes a cellular subflow through the shared wireless resource 44 and a WLAN subflow through the communication channel 34. In some implementations, the wireless device primarily utilizes the WLAN subflow while the cellular subflow remains idle. For example, the wireless device 20 shown in FIG. 1 primarily utilizes the communication channel 34 while the shared wireless resource 44 does not transmit data to the wireless device 20. In some implementations, the WLAN subflow encounters packet drop. In some implementations, C1 refers to a congestion window value for the WLAN subflow prior to the WLAN subflow experiencing packet drop. In some implementations, C2 refers to a congestion window value for the WLAN subflow after the WLAN subflow experiences packet drop. In some implementations, C2 is a fraction of C1. For example, in some implementations, C2 is half of C1.

As represented by block 552, in various implementations, the method 550 includes selecting other wireless devices (e.g., the other wireless devices 21a ... 21n shown in FIG. 1) based on respective locations of the other wireless devices relative to a location of a first wireless device (e.g., the wireless device 20 shown in FIGS. 1-2). In some implementations, the method 550 includes selecting other wireless devices that are within a threshold distance of the first wireless device. In some implementations, the method 550 includes selecting other wireless devices that are in the same city/state/country as the first wireless device. In some implementations, the method 550 includes selecting other wireless devices that are in the same cellular cell as the first wireless device. In some implementations, the method 550 includes selecting other wireless devices that are being served by the same base station as the first wireless device. In some implementations, the method 550 includes utilizing the location information 58 to select other wireless devices that are within a threshold distance of the first wireless device.

As represented by block 554, in various implementations, the method 550 includes filtering out other wireless devices based on inactivity. In some implementations, a wireless device is connected to the base station but the connection is idle. In some implementations, the method 550 includes filtering out other wireless devices that are idle. In some implementations, the method 550 includes filtering out other wireless devices that are not utilizing the shared wireless resource 44 to receive/transmit data.

As represented by block 556, in various implementations, the method 550 includes filtering out other wireless devices based on subscription information. In some implementations, the method 550 includes selecting other wireless devices that have a similar or the same cellular subscription plan as the first wireless device. In some implementations, the method 550 includes selecting other wireless devices that have bandwidth allocations that are within a threshold of a bandwidth allocation of the first wireless device. In some implementations, the method 550 includes selecting other wireless devices based on the subscription information 60.

As represented by block 558, in various implementations, the method 550 includes filtering out other wireless devices based on their respective congestion window values. As described herein, in some implementations, C1 refers to a congestion window value for the WLAN subflow prior to the WLAN subflow experiencing packet drop, and C2 refers to a congestion window value for the WLAN subflow after the WLAN subflow experiences packet drop. In some implementations, the method 550 includes selecting other wireless devices that have congestion window values that are within a threshold of C1. In some implementations, the method 550 includes filtering out other wireless devices that have congestion window values that are not within a threshold of C1. For example, in some implementations, the method 550 includes filtering out other wireless devices that have congestion window values that are less than C2.

As represented by block 560, in various implementations, the method 550 includes determining an average of the congestion window values of the other wireless devices that have not been filtered out. In some implementations, the average of the congestion window values is referred to as Cavg.

As represented by block 562, in various implementations, the method 550 includes determining the initial congestion window value for the first wireless device based on the average of the congestion window values of the other wireless devices. For example, in some implementations, the method 550 includes determining the initial congestion window value 64 shown in FIGS. 1 and 3 based on Cavg. In some implementations, the method 550 includes setting the initial congestion window value to a value that is within a threshold of Cavg. For example, in some implementations, the method 550 includes setting the initial congestion window value to a predefined percentage of Cavg (e.g., setting the initial congestion window value to 90% of Cavg).

In some implementations, the method 550 includes adding Cavg to C2 and determining whether the sum is less than C1. In some implementations, the method 550 includes setting the initial congestion window value to Cavg in response to the sum being less than C1. In some implementations, if the sum is greater than C1, the method 550 includes setting the initial congestion window value such that the sum of the initial congestion window value and C2 is less than C1. In some implementations, the combined congestion windows of the cellular subflow and the WLAN subflow are less than the congestion window of the WLAN prior to experiencing packet loss. As such, in various implementations, the cellular subflow is not overused and is used only to compensate for the loss in the WLAN subflow. Preventing unnecessary overutilization of the cellular subflow reduces the cost of using the licensed spectrum. In some implementations, as the WLAN subflow recovers, the cellular subflow is gradually reduced. For example, in some implementations, as the WLAN subflow recovers, the congestion window value of the cellular subflow is gradually reduced until it is zero.

In some implementations, the method 550 includes setting the initial congestion window value such that the initial congestion window value is greater than a default congestion window value that is typically used in a slow-start process. In some implementations, the default congestion window value is 1 MSS. As such, in various implementations, the method 550 includes setting the initial congestion window value to a value that is greater than 1 MSS.

Table 1 illustrates an example scenario with 20 wireless devices (e.g., WD 1, WD 2, WD 3 ... WD 20). In the example of Table 1, all 20 wireless devices have MPTCP connections with a cellular subflow and a WLAN subflow. In other words, in the example of Table 1, each of the 20 wireless devices are in communication with an access point (AP) that utilizes a first RAT (e.g., a WLAN) and a base station (e.g., an eNode B (eNB)) that utilizes a second RAT (e.g., a cellular network). In the example of Table 1, 10 of the 20 wireless devices (e.g., WD 1, WD 2 ... WD 10) are connected to the same base station (e.g., eNB 1) and the same access point (AP 1). In the example of Table 1, WD 10 is receiving data via the AP at a current congestion window value (C1) of 300. The cellular path for WD 10 has a bandwidth of 10 Mbps, but the cellular path is currently idle. The cellular paths for WD 1, WD 2 and WD 3 are also idle. The cellular paths for WD 4 and WD 5 are active, and their subscription bandwidths are 5 Mbps and 7 Mbps, respectively. The cellular paths for WD 6 is active, its subscription bandwidth is greater than 10 Mbps, and the cellular congestion window value is 50 MSS. The cellular paths for WD 7, WD 8 and WD 9 are active. The subscription bandwidths of WD 7, WD 8 and WD 9 are 12 Mbps, 15 Mbps and 20 Mbps, respectively. The cellular congestion window values for WD 7, WD 8 and WD 9 are 200 MSS, 250 MSS and 150 MSS, respectively.

TABLE 1

Example Scenario

| Wireless Device (WD) | eNB | Cell Status | Bandwidth subscription | Cell cwnd | Access Point (AP) | AP cwnd |
|---|---|---|---|---|---|---|
| WD 1 | eNB 1 | Idle | | | AP 1 | |
| WD 2 | eNB 1 | Idle | | | AP 1 | |
| WD 3 | eNB 1 | Idle | | | AP 1 | |
| WD 4 | eNB 1 | Active | 5 Mbps | | AP 1 | |
| WD 5 | eNB 1 | Active | 7 Mbps | | AP 1 | |
| WD 6 | eNB 1 | Active | 12 Mbps | 50 | AP 1 | |
| WD 7 | eNB 1 | Active | 12 Mbps | 200 | AP 1 | |
| WD 8 | eNB 1 | Active | 15 Mbps | 250 | AP 1 | |
| WD 9 | eNB 1 | Active | 20 Mbps | 150 | AP 1 | |
| WD 10 | eNB 1 | Idle | 10 Mbps | | AP 1 | 300 |
| WD 11 | eNB 2 | | | | AP 2 | |
| ... | | | | | | |
| WD 20 | eNB 2 | | | | AP | |

In some implementations, WD 10 experiences data loss over a communication channel provided by AP 1. For example, in some implementations, the congestion window value for WD 10 drops from a C1 of 300 to a C2 of 150. As such, the cellular path for WD 10 is activated. If data transmissions on the cellular path are initiated in accordance with a default congestion window value of 1 MSS, the congestion window value for the cellular path increases exponentially with each acknowledgement (e.g., the congestion window value for the cellular path increases to 2, 4, 6, 16, etc.). In the meantime, the congestion window value for the WLAN path increases linearly. As such, it takes time T for the combined congestion window value to increase back to 300. During time duration T, WD 10 receives a throughput that is significantly less than the throughput that WD 10 received prior to packet loss on the WLAN path. By contrast, as described herein, in various implementations, data transmissions on the cellular path are initiated in accordance with an initial congestion window value that is greater than the default congestion window value associated with the slow-start process.

In the example of Table 1, after detecting packet loss over the communication path between WD 10 and AP 1, the wireless resource controller 50 identifies other wireless devices that are being served by the same base station as WD 10. In some implementations, the wireless resource controller 50 identifies other wireless devices that are being served by the same based station and the same AP as WD 10. As such, the wireless resource controller 50 identifies WD 1, WD 2 ... WD 9 because they are being served by eNB 1 and AP 1. In some implementations, the wireless resource controller 50 filters out wireless devices that have idle cellular connections. As such, in the example of Table 1, the wireless resource controller 50 filters out WD 1, WD 2 and WD 3 because their cellular connections are idle. In some implementations, the wireless resource controller 50 filters out wireless devices with subscription bandwidths that are less than a subscription bandwidth of WD 10. As such, the wireless resource controller 50 filters out WD 4 and WD 5 because their subscription bandwidths of 5 Mbps and 7 Mbps, respectively, are less than the subscription bandwidth of WD 10 (10 Mbps). In some implementations, the wireless resource controller 50 filters out other wireless devices with a congestion window value that is not within a threshold of the congestion window value C1 that WD 10 had prior to the packet loss over the WLAN subflow. As such, the wireless resource controller 50 filters out WD 6 because its cellular congestion window value of 50 is much less than the congestion window value C1 that WD 10 had prior to experiencing packet loss.

In some implementations, the wireless resource controller 50 computes an average of the congestion window values of the remaining wireless devices. As such, the wireless resource controller 50 computes an average of 200, 250 and 150. In the example of Table 1, the average is 200. In some implementations, the wireless resource controller 50 adjusts the average by computing a fraction of the average. For example, the wireless resource controller 50 computes 90% of the average. In the example of Table 1, the wireless resource controller 50 adjusts the average of 200 to 180, which is 90% of 200.

In some implementations, the wireless resource controller 50 determines whether the adjusted average results in overutilization of the shared wireless resource. In some implementations, the wireless resource controller 50 adds the adjusted average (180) to C2 (150) and determines whether the sum is less than C1 (300). In this example, the sum (180+150=330) is greater than C1 (300). In some implementations, if the sum is less than C1, the wireless resource controller 50 sets the initial congestion window value to the adjusted average. In some implementations, when the sum is greater than C1, the wireless resource controller 50 sets the initial congestion window value to C2 in order to compensate for the loss of C1. As such, in the example of Table 1, the wireless resource controller 50 sets the initial congestion window value for the cellular path between WD 10 and eNB 1 to 150. Setting the initial congestion window value to 150 provides a combined congestion window value of 300, which is the same as C1 (300). As such, WD 10 does not experience a reduction in throughput.

Figure 6:
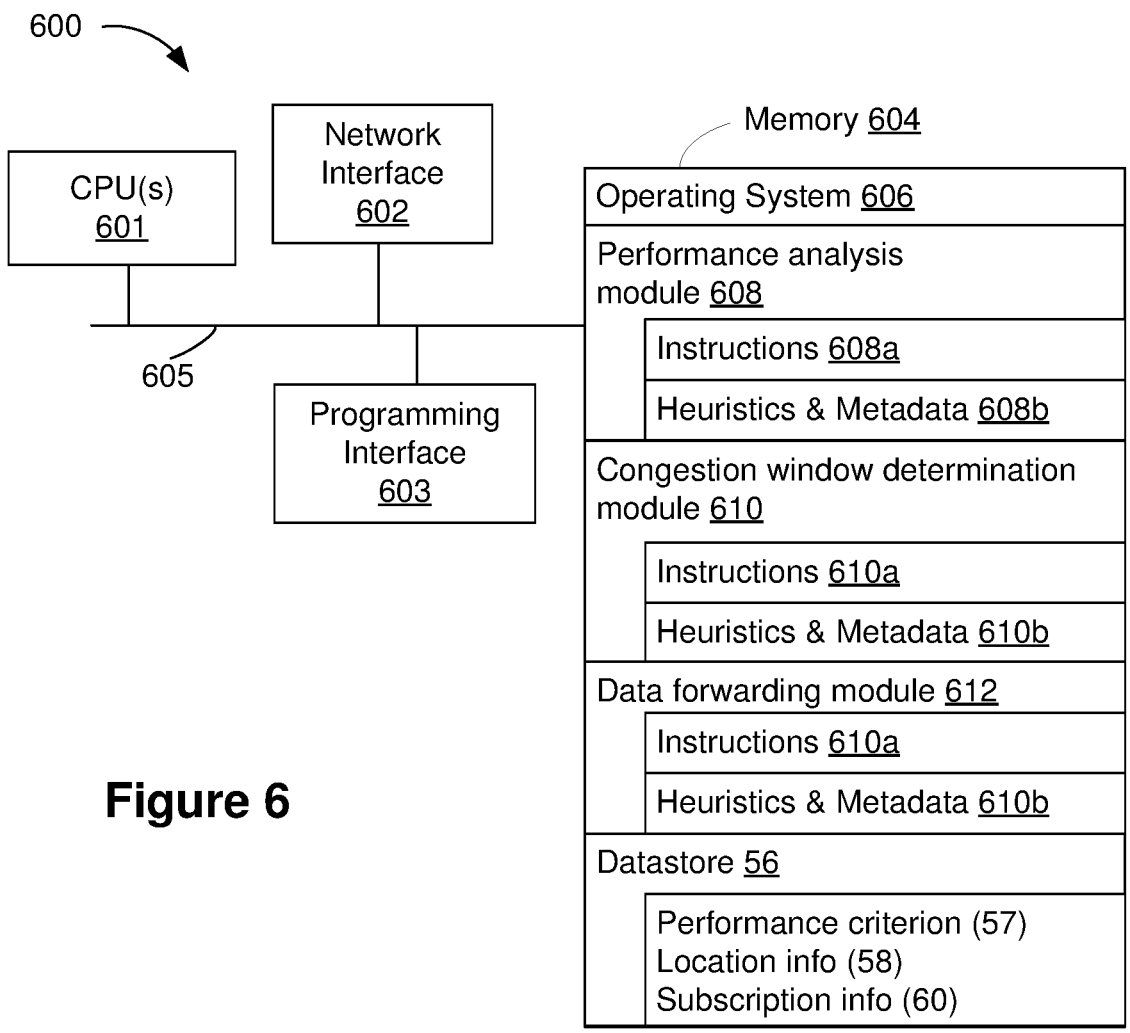
FIG. 6 is a block diagram of a server system enabled with various modules that are provided to control a congestion window value for a wireless device in a heterogeneous network in accordance with some implementations.

FIG. 6 is a block diagram of a server system 600 enabled with one or more components of a wireless resource controller (e.g., the wireless resource controller 50 shown in FIGS. 1-3) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604, and one or more communication buses 605 for interconnecting these and various other components.

In some implementations, the network interface 602 is provided to, among other uses, establish and maintain a metadata tunnel between a cloud hosted network management system and at least one private network including one or more compliant devices. In some implementations, the communication buses 605 include circuitry that interconnects and controls communications between system components. The memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 604 optionally includes one or more storage devices remotely located from the CPU(s) 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, a performance analysis module 608, a congestion window determination module 610, a data forwarding module 612 and the datastore 56. In various implementations, the performance analysis module 608, the congestion window determination module 610 and the data forwarding module 612 perform substantially the same operations as the performance analyzer 52, the congestion window determiner 62 and the data forwarder 66, respectively, shown in FIG. 3. For example, in various implementations, the performance analysis module 608 receives performance data characterizing a performance of a communication channel between a wireless device and an AP (e.g., the performance data 54 shown in FIG. 3). In some implementations, the performance analysis module 608 determines whether the performance data breaches the performance criterion 57 stored in the datastore 56. To that end, in various implementations, the performance analysis module 608 includes instructions and/or logic 608a, and heuristics and metadata 608b. In various implementations, the congestion window determination module 610 determines an initial congestion window value for the wireless device (e.g., the initial congestion window value 64 shown in FIGS. 1 and 3). To that end, in various implementations, the congestion window determination module 610 includes instructions and/or logic 610a, and heuristics and metadata 610b. In various implementations, the data forwarding module 612 forwards data to the wireless device via a cellular network in accordance with the initial congestion window value. For example, the data forwarding module 612 determines an amount of data to forward (e.g., the amount 72a shown in FIGS. 1 and 3) and/or a data rate at which to forward the data (e.g., the data rate 72b shown in FIGS. 1 and 3). To that end, in various implementations, the data forwarding module 612 includes instructions and/or logic 612a, and heuristics and metadata 612b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a wireless resource controller including a non-transitory memory and one or more processors coupled with the non-transitory memory:
   receiving an indication that a first wireless device is experiencing data loss over a communication channel provided by a wireless access point utilizing a first radio access technology (RAT);
   receiving location information for the first wireless device and for other wireless devices that share a shared wireless resource with the first wireless device;
   determining a plurality of congestion window values associated with the other wireless devices that share the shared wireless resource with the first wireless device and that, based on the location information, are within a threshold distance of the first wireless device, wherein the shared wireless resource is provided by a base station of a cellular network utilizing a second RAT;
   determining an initial congestion window value for the first wireless device based on the plurality of congestion window values associated with the other wireless devices; and transmitting data to the first wireless device via the base station in accordance with the initial congestion window value for the first wireless device in order to satisfy a performance criterion for the first wireless device.

2. The method of claim 1, wherein determining the initial congestion window value includes determining an average of the plurality of congestion window values associated with the other wireless devices.

3. The method of claim 2, wherein determining the initial congestion window value includes setting the initial congestion window value to a value that is within a threshold of the average of the plurality of congestion window values associated with the other wireless devices.

4. The method of claim 1, wherein the first wireless device and the other wireless devices are located in a cellular cell that is served by the base station.

5. The method of claim 1, wherein determining the plurality of congestion window values includes:
estimating the plurality of congestion window values based on congestion conditions of data flows between the other wireless devices and the base station.

6. The method of claim 1, wherein determining the plurality of congestion window values includes:
receiving subscription information for the first wireless device and for the other wireless devices; and
determining, based on the subscription information, that the first wireless device and the other wireless devices are associated with a particular cellular service plan.

7. The method of claim 1, wherein a first downlink bandwidth associated with the first wireless device is within a threshold of respective downlink bandwidths associated with the other wireless devices.

8. A wireless resource controller comprising:
a processor provided to execute computer readable instructions included on a non-transitory memory; and
a non-transitory memory including computer readable instructions, that when executed by the processor, cause the wireless resource controller to:
receive an indication that a first wireless device is experiencing data loss over a communication channel provided by a wireless access point utilizing a first radio access technology (RAT);
receive location information for the first wireless device and for other wireless devices that share a shared wireless resource with the first wireless device;
determine a plurality of congestion window values associated with the other wireless devices that share the shared wireless resource with the first wireless device and that, based on the location information, are within a threshold distance of the first wireless device, wherein the shared wireless resource is provided by a base station of a cellular network utilizing a second RAT;
determine an initial congestion window value for the first wireless device based on the plurality of congestion window values associated with the other wireless devices; and
transmit data to the first wireless device via the base station in accordance with the initial congestion window value for the first wireless device in order to satisfy a performance criterion for the first wireless device.

9. The wireless resource controller of claim 8, wherein determining the initial congestion window value includes determining an average of the plurality of congestion window values associated with the other wireless devices.

10. The wireless resource controller of claim 9, wherein determining the initial congestion window value includes setting the initial congestion window value to a value that is within a threshold of the average of the plurality of congestion window values associated with the other wireless devices.

11. The wireless resource controller of claim 8, wherein determining the plurality of congestion window values includes:
estimating the plurality of congestion window values based on congestion conditions of data flows between the other wireless devices and the base station.

12. The wireless resource controller of claim 8, wherein determining the plurality of congestion window values includes:
receiving subscription information for the first wireless device and for the other wireless devices; and
determining, based on the subscription information, that the first wireless device and the other wireless devices are associated with a particular cellular subscription plan.

13. The wireless resource controller of claim 8, wherein a first downlink bandwidth associated with the first wireless device is within a threshold of respective downlink bandwidths associated with the other wireless devices.

14. The wireless resource controller of claim 8, wherein the other wireless devices are actively receiving data from the cellular network.

15. The wireless resource controller of claim 8, wherein the performance criterion for the first wireless device defines a threshold throughput, and the initial congestion window value provides a throughput that satisfies the threshold throughput.

16. The wireless resource controller of claim 8, wherein the initial congestion window value is greater than a default congestion window value associated with a slow-start process, wherein the default congestion window value provides a throughput that breaches a threshold throughput.

17. A non-transitory computer readable storage medium storing one or more programs, the one or more programs comprising instructions, which, when executed by a wireless resource controller with a processing device, cause the wireless resource controller to perform or cause performance of:
receiving an indication that a first wireless device is experiencing data loss over a communication channel provided by a wireless access point utilizing a first radio access technology (RAT);
receiving location information for the first wireless device and for other wireless devices that share a shared wireless resource with the first wireless device;
determining a plurality of congestion window values associated with the other wireless devices that share the shared wireless resource with the first wireless device and that, based on the location information, are within a threshold distance of the first wireless device, wherein the shared wireless resource is provided by a base station of a cellular network utilizing a second RAT;
determining an initial congestion window value for the first wireless device based on the plurality of congestion window values associated with the other wireless devices; and
transmitting data to the first wireless device via the base station in accordance with the initial congestion window value for the first wireless device in order to satisfy a performance criterion for the first wireless device.

18. The non-transitory computer readable storage medium of claim 17, wherein determining the initial congestion window value includes determining an average of the plurality of congestion window values associated with the other wireless devices.

19. The non-transitory computer readable storage medium of claim 18, wherein determining the initial congestion window value includes setting the initial congestion window value to a value that is within a threshold of the average of the plurality of congestion window values associated with the other wireless devices.

20. The method of claim 1, wherein the location information is received for a particular wireless device via multipath Transmission Control Protocol (MPTCP) options of a Transmission Control Protocol (TCP) header of one or more packets associated with the particular wireless device.

* * * * *